United States Patent
Ye et al.

(10) Patent No.: US 9,348,657 B2
(45) Date of Patent: May 24, 2016

(54) METHOD AND SYSTEM OF SYNCHRONIZING PROCESSORS TO THE SAME COMPUTATIONAL POINT

(71) Applicant: Emerson Network Power—Embedded Computing, Inc., Tempe, AZ (US)

(72) Inventors: Shugao Ye, Shenzhen (CN); Liu Jiang, Shenzhen (CN); Kai Hu, Shenzhen (CN); Martin Peter John Cornes, Phoenix, AZ (US); Pasi Jukka Petteri Vaananen, Waltham, MA (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 158 days.

(21) Appl. No.: 14/254,930

(22) Filed: Apr. 17, 2014

(65) Prior Publication Data

US 2015/0193341 A1  Jul. 9, 2015

(30) Foreign Application Priority Data

Jan. 8, 2014  (CN) .......................... 2014 1 0008511

(51) Int. Cl.
*G06F 12/00*  (2006.01)
*G06F 9/52*  (2006.01)

(52) U.S. Cl.
CPC ...................................... *G06F 9/522* (2013.01)

(58) Field of Classification Search
CPC .............................. G06F 9/30029; G06F 9/52
See application file for complete search history.

(56) References Cited

U.S. PATENT DOCUMENTS

| 7,549,082 | B2 | 6/2009 | Southgate et al. |
| 7,549,085 | B2 | 6/2009 | Del Vigna, Jr. et al. |
| 7,730,350 | B2 | 6/2010 | Southgate et al. |
| 8,103,861 | B2 | 1/2012 | Klecka et al. |

*Primary Examiner* — Gurtej Bansal
(74) *Attorney, Agent, or Firm* — Harness, Dickey & Pierce, P.L.C.

(57) ABSTRACT

A system for synchronizing central processing units (CPU) includes a schedule module that communicates a synchronization point, a first CPU that writes a first memory address to a first register in response to the first CPU reaching the synchronization point, and a second CPU that writes a second memory address to a second register in response to the second CPU reaching the synchronization point. The system further includes a first logical AND module that writes a first value to a third register based on the first and second memory addresses and a second logical AND module that writes a second value to a fourth register based on the first and second memory addresses. The system also includes a scheduler module that selectively generates a processor sync signal based on the first and second value.

10 Claims, 5 Drawing Sheets

METHOD AND SYSTEM OF SYNCHRONIZING PROCESSORS TO THE SAME COMPUTATIONAL POINT

CROSS-REFERENCE TO RELATED APPLICATIONS

This application claims the benefit and priority of Chinese Application No. 201410008511.8 filed Jan. 8, 2014. The entire disclosure of the above application is incorporated herein by reference.

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An external safety system, such as a railway system, may include fault-tolerant failsafe computer systems configured to implement a safety application. The fault-tolerant failsafe computer systems may include a plurality of hardware components electrically and logically coupled in order to implement the safety application. The safety application selectively communicates with safety critical hardware and software. The safety critical hardware and software are configured to control safety relevant functions of the railway system.

For example, a train riding on the railway system includes a braking system. The braking system is configured to implement at least one safety relevant function, such as a braking function. The braking system includes a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

Central processing units (CPUs) in the past had the ability to be instruction lock stepped. For example, each instruction and data on a backplane or bus would be identical. However, modern CPUs are no longer deterministic. Multiple CPUs executing the same code may not execute in exactly the same sequence because of multi-threading and caching techniques that are used today. Further the frequencies of today's processors far exceed older generations of CPUs. Accordingly, a system and method for synchronizing CPUs to the same computation point is desired.

SUMMARY

This section provides a general summary of the disclosure, and is not a comprehensive disclosure of its full scope or all of its features.

A system for synchronizing central processing units (CPU) includes a schedule module that communicates a synchronization point, a first CPU that writes a first memory address to a first register in response to the first CPU reaching the synchronization point, and a second CPU that writes a second memory address to a second register in response to the second CPU reaching the synchronization point. The system further includes a first logical AND module that writes a first value to a third register based on the first and second memory addresses and a second logical AND module that writes a second value to a fourth register based on the first and second memory addresses. The system also includes a scheduler module that selectively generates a processor sync signal based on the first and second value.

In other features, a method includes writing a first memory address to a first register, writing a second memory address to a second register, writing a first value to a third register based on the first and second memory addresses, writing a second value to a fourth register based on the first and second memory addresses, and selectively generating a processor sync signal based on the first and second value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
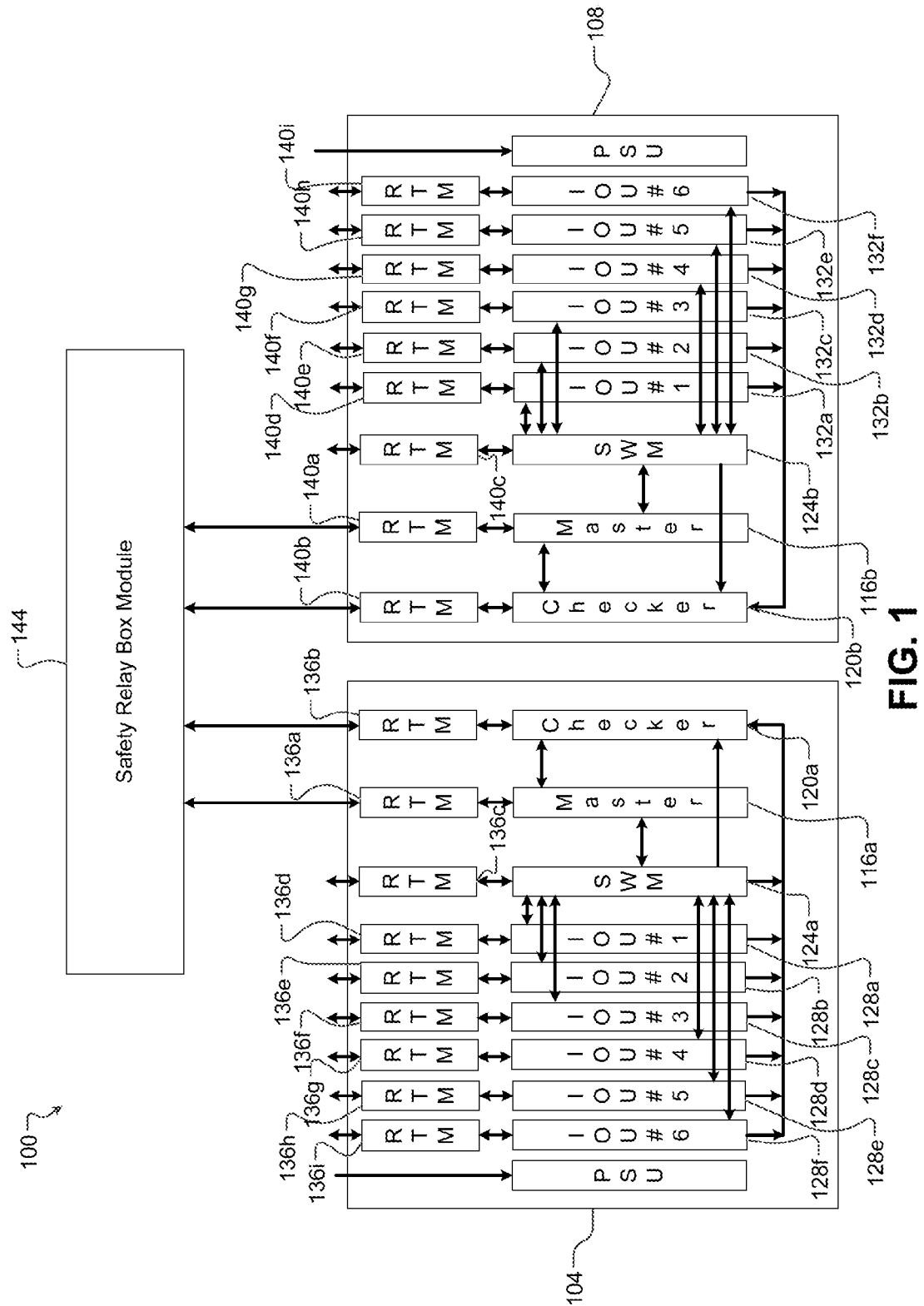
FIG. 1 is a functional block diagram of a fault-tolerant failsafe computer system according to the principles of the present disclosure.

Referring now to FIG. 1, a functional block diagram of an exemplary fault-tolerant failsafe computer system 100 is shown. The system 100 is arranged to interact with safety applications. For example, the system 100 is arranged to communicate with safety critical hardware and software associated, by way of non-limiting example, a railway system. The safety critical hardware and software control safety relevant components of the railway system. For example, the safety critical hardware may be coupled to a brake system of a train operating on the railway system. Further, the system 100 may be capable of being certified according to an industry recognized safety standard.

The safety critical hardware receives data elements from the safety critical software to actuate a brake of the brake system. The system 100 interfaces with the safety critical hardware and software to ensure the safety critical hardware and software are operating according to a predetermined operating standard. It is understood that while only a brake system of the train is described, the principles of the present disclosure apply to any safety critical hardware and software. Other possible applications for the embodiments described herein include, but are not limited to, components of an airline system, components of a medical treatment system, components of an oil and gas control system, components of a smart grid system, and components of various manufacturing systems.

In some implementations, the system 100 receives a plurality of incoming data packets from an external safety system, such as the railway system. The system 100 is configured to process the plurality of incoming data packets and communicate a plurality of outgoing data packets to safety relevant components of the external safety system. For example, the system 100 determines whether a first packet of the plurality of incoming data packets is a valid packet. When the system 100 determines the first packet is a valid packet, the system 100 communicates an outgoing packet to at least one safety relevant component of the railway system.

The first packet includes data elements to be acted on by the at least one safety relevant component of the railway system. The data elements may include sensor data and/or input/output (I/O) point states. The at least one safety relevant component may be a brake coupled to a train riding on the railway system. It is understood that while only safety relevant components of the external safety system are described, the first packet may include data elements to be acted on by non-safety relevant components of the external safety system. The data elements are formatted according to a transfer protocol. For example, the railway system is configured to package the data elements according to a predetermined packaging standard into transferable packets. The railway system then transfers the plurality of incoming data packets according to the transfer protocol.

The system 100 is arranged to receive packets transmitted according to the transfer protocol. Further, the system 100 is configured to interpret the predetermined packaging standard. The system 100 then extracts the data elements from the first packet and generates an outgoing data packet based on the data elements. The outgoing data packet includes a set of instructions based on the data elements. While only instructions are discussed, the outgoing data packet may also include operating instruction to control I/Os, a request to read an input in order to gather information, health message communications, a request for inter-process communication, or other suitable elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies a brake.

The system 100 determines whether to communicate the outgoing data packet and data elements to the safety critical hardware and software. For example, the system 100 ensures each of the plurality of incoming data packets meet a predetermined safety standard. The predetermined safety standard includes determining whether or not the railway system is operating according to a predefined set of operating standards. The system 100 verifies that each of the plurality of incoming data packets was intentionally transferred by the railway system 100. For example only, the railway system may transfer erroneous incoming data packets due to a hardware or software fault within the railway system.

The safety critical hardware and software receives the first packet of the plurality of incoming data packets in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture. The safety critical hardware and software communicate the plurality of incoming data packets, including the first and second packet, to the system 100. The system 100 is configured to determine whether each of the plurality of incoming data packets was received by the safety critical hardware and software as a result of a fault in the railway system.

When the system 100 determines one of the plurality of incoming data packets was received in response to a command from the operator, the system 100 generates an outgoing data packet corresponding to the received incoming data packet. For example, the system 100 generates a first outgoing data packet based on the first packet. The first outgoing data packet includes a set of instructions corresponding to the data elements within the first packet. When the system 100 determines the first packet is a valid packet, the system 100 communicates the first outgoing data packet to the safety critical hardware and software. For example, the system 100 determines the first packet was received in response to a command from the operator. The system 100 communicates the first outgoing data packet to the safety critical hardware and software. The safety critical hardware and software execute the set of instructions included in the first outgoing data packet.

Conversely, when the system 100 determines one of the plurality of incoming data packets was received in response to a fault within the railway system, the system 100 does not communicate an outgoing data packet to the safety critical hardware and software. For example, the system 100 determines the second packet was received due to a fault in the railway system. The system 100 does not communicate an outgoing data packet corresponding to the second packet to the safety critical hardware and software. Consequently, the safety critical hardware and software do not execute instructions corresponding to data elements included in the second packet.

Further, the system 100 generates a fault indication based on the determination that a fault occurred within the railway system. In this way, data elements executed by the safety critical hardware and software are first verified by the system 100. This verification ensures the railway system is operating according to the predetermined safety standard.

In some implementations, the system 100 receives a first packet of the plurality of incoming data packets. Simultaneously, the system 100 receives a second packet of the plurality of incoming data packets. The system 100 then executes voting logic on the first and second packet. The voting logic may be implemented as a dual two-of-two (2oo2) system. The 2oo2 voting logic is explained in greater detail below. The system 100 determines whether the first and second packets are identical. When the system 100 determines the first and second packets are identical, the system 100 generates a first outgoing data packet and communicates the first outgoing data packet to at least one component of the safety critical hardware and software.

The at least one component then executes operating data elements included within the first outgoing data packet. Conversely, when the first and second packets are not identical, the system 100 identifies at least one component of the system 100 or the railway system as faulty. It is understood that while a railway system is described, the principles of the present disclosure apply to any external safety systems.

The system 100 also generates a safety indication. The safety indication may be indicative of a failure within the system 100 or the safety critical hardware and software. Further, the system 100 instructs the at least one component to operate in a predetermined safe state. For example, the safe state may include a set of safe state data elements arranged to maintain a safe operating environment of the railway system.

The safe state data elements include instructing the railway system to operate in a predetermined operating mode that ensures the overall safety of the railway system. For example only, the predetermined operating mode includes bringing a train operating on the railway system to a stop. In some implementations, the safe state includes disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108. In this way, when one of the active FSC 104 and the standby FSC 108 encounters a hardware or software failure, the other of the active FSC 104 and the standby FSC 108 is configured to operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. The active FSC 104 receives two copies of a first packet of the plurality of incoming data packets.

The active FSC 104 determines the validity of the first packet. The active FSC 104 continuously generates a first health status signal and a second health status signal based on the determination of whether the first packet is valid. In some implementations, continuously generating a signal may include setting the signal to a first predetermined value. The continuously generated signal is then maintained at the first predetermined value until the signal is de-asserted to a second predetermined value.

The active FSC 104 compares each of the two copies of the first packet. When the two copies are identical, the active FSC 104 determines the first packet is valid. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. It is understood that the first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy.

As will be discussed in detail below, the system 100 instructs the active FSC 104 to operate in a safe state in order to maintain the safety of the system 100. It is understood that while only voting mismatches are discussed in relation to the first and second status signals being de-asserted, any hardware or software failure within the system 100 may cause one of the first and second status signals to be de-asserted. The health status signal may indicate the system 100 is operating according to a predetermined operating standard. In this way, the health status signal indicates the system 100 is healthy.

When the active FSC 104 determines that the two copies of the first packet are not identical, the active FSC 104 determines a voting fault has occurred. The active FSC 104 generates a fault signal based on the determination that a voting fault has occurred. The fault signal is indicative of a detected fault within the system 100. The fault may be due to hardware or software failure within the system 100 or the external safety system. For availability reasons, if the active FSC 104 encounters a hardware or software failure, the system 100 forces the active FSC 104 to a predetermined safe state. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in an overall system architecture. For example, the higher-level equipment may be components of a railway braking system of the railway system.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may implemented as a plurality of light emitting diodes (LEDs).

The communication links communicate with hardware components and software applications external to the system 100. Further, the system 100 is configured to receive input and communicate output to a field engineer. For example, the field engineer may selectively configure the system 100 by communicating with the a user interface of the system 100.

Each of the active FSC 104 and the standby FSC 108 are arranged to execute a health and safety application. For example, the active FSC 104 and the standby FSC 108 include a memory and a processor. The health and safety application may be software loaded into the memory of the active FSC 104 and the standby FSC 108. The health and safety application is then executed by the processor of the active FSC 104 and the standby FSC 108.

The health and safety application monitors and controls the active FSC 104 and the standby FSC 108. For example, the health and safety application generates a plurality of health signals. The plurality of health signals may include, but is not limited to, a module health signal and a mask signal. The health and safety application generates the plurality of signals based on a fault in active FSC 104, for example. The health and safety application is a functional safety subsystem designed to detect and respond to failures by forcing one of the active FSC 104 or the standby FSC 108 to the safe state.

It is understood that the health and safety application may include any safety applications executed on an external safety system. This may include ensuring the validity and safety of a set of data elements prior to the set of data elements being executed by the hardware and software of the railway system. The health and safety application is also configured to ensure the railway system operates in the predetermined safe state when the health and safety application detects a failure in the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116a and the checker CPU 120a execute identical software and implement identical processing functions. The master CPU 116a and the checker CPU 120a are configured to perform identical functions in order to maintain full hardware fault and error detection coverage of the safety critical hardware and software and allow for voting on outgoing packets in the correct sequence.

In some implementations, the master CPU 116a receives a request to perform a task from at least one of the safety critical hardware or software of the railway system. The request to perform a task is based on a command received by the safety critical hardware and software from the operator of the external safety system. For example, the operator of the railway system may command a train riding on the railway system to increase speed. The operator may actuate a physical lever within the train. The physical lever is arranged to generate a signal indicative of the command to increase the speed of the train. The signal is communicated to the safety critical hardware and software.

Prior to executing the command, the safety critical hardware and software communicate the safety relevant task to the system 100. The system 100 is configured to interpret the signal and determine a requested task associated with the signal. The system 100 then determines whether the requested task is indicative of a safety relevant task. For example, the requested task may be a safety relevant task or a non-safety relevant task. In one example, a non-safety relevant task includes instructions that instruct the safety critical hardware and software to return a current status of the train operating within the railway system. In another example, a safety-relevant task includes instructions that instruct the safety critical hardware and software to increase the speed of the train.

The system 100 compares the requested task to a list of predefined tasks. The system 100 determines, based on the predefined tasks, whether the requested task is safety relevant. When system 100 determines the requested task is a safety relevant task, the system 100 generates a packet corresponding to the requested task. It is understood that while only a safety relevant task is described herein, the system 100 may generate a packet from any task. The system 100 communicates the packet to the master CPU 116a. Both the master CPU 116a and the checker CPU 120a are configured to verify the validity of the packet before the safety critical hardware and software execute the requested task. For example, the request to perform a task may be one of the plurality of incoming data packets.

Simultaneously, the checker CPU 120a receives a copy of the same packet corresponding to the requested task. Each of the master CPU 116a and the checker CPU 120a is configured to communicate a copy of the packet to the other of the master CPU 116a and the checker CPU 120a. Prior to the master CPU 116a instructing the safety critical hardware and software to perform the requested task, the master CPU 116a and the checker CPU 120a compare the packet received by each of the master CPU 116a and the checker CPU 120a. For example, the master CPU 116a and the checker CPU 120a perform 2oo2 voting on the packet.

When the packets are identical, the master CPU 116a instructs the safety critical hardware and software to perform the requested task. For example, the master CPU 116a and the checker CPU 120a generates an outgoing packet associated with the requested task. When voting is successful (i.e., the packets are identical) the master CPU 116a communicates the outgoing packet to the safety critical hardware and software to execute the requested task.

The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train.

Conversely, when the packets are not identical, the master CPU 116a and the checker CPU 120a do not instruct the safety critical hardware and software to perform the requested task. The master CPU 116a generates a fault signal. The fault signal is indicative of a failure within the system 100, the safety critical hardware and software, or the external safety system. In this way, the master CPU 116a verifies that the requested task is a valid request from a valid source (i.e., an external hardware component or software application.)

For example only, the master CPU 116a receives erroneous requests to perform tasks due to external hardware failure, a software error, or an overall system malfunction. It is understood that while only the master CPU 116a and the checker CPU 120a are described, the principles described above also apply to the master CPU 116b and the checker CPU 120b.

Each of the active FSC 104 and the standby FSC 108 include a plurality of input/output unit (IOU) modules. The active FSC 104 includes IOU modules 128a-128f. The IOU modules 128a-128f will hereinafter be referred to as the IOU module 128. Similarly, the standby FSC 108 includes IOU modules 132a-132f, which are identical to the IOU modules 128a-128f. The IOU modules 132a-132f will hereinafter be referred to as the IOU module 132.

The active FSC 104 and the standby FSC 108 also each include a voting subsystem, an input/output (I/O) subsystem, and a switch module 124a and a switch module 124b respectively. The switch module 124a and the switch module 124b are configured to be identical. The switch module 124a and the switch module 124b route packets received from the I/O subsystem to the master CPUs 116a and 116b and the checker CPUs 120a and 120b.

For example, the switch module 124a may route a packet received from the master CPU 116a to an external network component. Further, the switch module 124a receives packets from an external component and routes the received packets to the master CPU 116a, the checker CPU 120b, and the I/O subsystem. Further, the switch module 124a communicates the received packets to the voting subsystem. It should be appreciated that while only the switch module 124a is described, the principles described above also apply to the switch module 124b.

The IOU module 128 implements the I/O subsystem within the active FSC 104. The I/O system is configured to provide a gateway between lower-level network equipment and the master CPU 116a and the checker CPU 120a. The IOU module 128 isolates the master CPU 116a and the checker CPU 120a from low level protocols required by external hardware and software. In this way, the IOU module 128 adds a safety layer on the internal Ethernet to support safe communication between the master CPU 116a, checker CPU 120a, and the external hardware and software. The IOU module 128 and the switch module 124a may be referred to collectively as the front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136a-136i. The standby FSC 108 includes RTMs 140a-140i. It should be appreciated that because the standby FSC 108 is a redundant configuration of the active FSC 104, the RTMs 136a-136i are identical to the RTMs 140a-140i. In some implementations, each of the RTMs 136a-136i may be hot swappable field replaceable units (FRUs).

For example, each of the RTMs 136a-136i may be removed and replaced by a field engineer without first having to power off the entire system 100. The RTMs 136a-136i allows the active FSC 104 to communicate with the external hardware and software components. For example, the RTM 136a electrically and logically couples the master CPU 116a to components external to the active FSC 104. Similarly, the RTM 136b electrically and logically couples the standby FSC 108 to external hardware and software components.

The front blades 124a-128f each includes a first memory location and a second memory location. The first and second memory locations store a value received from a corresponding hardware component of the active FSC 104. For example, the master CPU 116a continuously generates a module health signal (described above) indicative of the module health of the master CPU 116a. The master CPU 116a stores a 1 in the first memory location when the module health signal indicates the master CPU 116a is healthy.

Each of the front blades 124a-128f and the master CPU 116a generates a module health signal. Each of the front blades 124a-128f stores a value indicative of the module health signal in a first memory location. For example only, the switch module 124a stores a 1 in a first memory location associated with switch module 124a when the module health signal indicates the switch module 124a is healthy.

Conversely, the switch module 124a stores a 0 in the first memory location when the module health signal indicates the switch module 124a is not healthy. It is understood that while only the switch module 124a is described, the principles discussed herein apply to all modules within the system 100. It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116a.

The master CPU 116a determines whether the active FSC 104 is healthy based on receipt of a plurality of values corresponding to the module health signals generated by each of the front blades 124a-128f and a module health signal generated by the master CPU 116a. For example only, the master CPU 116a determines that the active FSC 104 is healthy when each of the received values corresponding to the module health signals indicates that each of the modules within the system 100 is healthy. Conversely, the master CPU 116a determines that the active FSC 104 is not healthy when at least one of the received values corresponding to the module health signals indicates that at least one of the modules within the system 100 is not healthy.

In another implementation, a value indicative of the module health signal is stored in a module configured at the front of the system 100. For example, a module configured on the opposite side of the system 100 from the RTM 136s stores a 1 in the first memory location when the module health signal indications the master CPU 116a is healthy. It is understood that while only the master CPU 116a is described, the principles described herein apply to the checker CPU 120a.

The master CPU 116a receives a first packet of the plurality of incoming data packets. Simultaneously, the checker CPU 120a receives a copy of the first packet. The master CPU 116a and the checker CPU 120a determine whether the first packet and the copy of the first packet are identical. When the first packet and the copy of the first packet are identical, the master CPU 116a continuously generates a module health signal. The module health signal may be set to 1 or a high signal value. The value of the module health signal is indicative of the health of the active FSC 104. The master CPU 116a stores a 1 in the first memory location.

Conversely, when the first packet and the copy of the first packet are not identical, the master CPU 116a generates an invalid module health signal. For example, the master CPU 116a de-asserts the module health signal. The master CPU 116a stores a 0 in the first memory location. The master CPU 116a receives a mask signal indicative of the state of the mask register within the master CPU 116a. For example, the mask register is a programmable bit within each of the master CPU 116a and the checker CPU 120a.

The mask register is set when a requested task is a safety-relevant task. For example, the mask register is set to 1 when the system 100 determines the requested task is a safety-relevant task. The RTM 136a stores a 1 in the second memory location when the mask signal indicates the mask register within the master CPU 116*a* is set to a 1. Conversely, the RTM 136*a* stores a 0 in the second memory location when the mask signal indicates the mask register within the master CPU 116*a* is set to a 0.

The system 100 also includes a watchdog timer application. The watchdog timer application is a continuously running watchdog function that indicates whether the master CPU 116*a* is has stopped executing code. For example, the watch dog timer application monitors the master CPU 116*a*. The master CPU 116*a* generates a watchdog timer reset signal. The master CPU 116*a* communicates the watchdog timer reset signal to the watchdog timer application. The watchdog timer application determines whether the watchdog timer reset signal was received within a predefined period. For example, the predefined period may be 1 minute. The predefined period may be a configurable item.

The watchdog timer application generates a watchdog health signal based on the watchdog timer reset signal. For example, when the master CPU 116*a* communicates a watchdog timer reset signal after the predefined period, the watchdog timer application sets the watchdog health signal to 0. Conversely, when the master CPU 116*a* communicates the watchdog timer reset signal within the predefined period, the watchdog timer application sets the watchdog health signal to 1. In other words, the watchdog timer application determines a fault in the master CPU 116*a* when the master CPU 116*a* is incapable of communicating with the watchdog application within the predefined period. For example, the fault may be as a result of the master CPU 116*a* being stuck in a software loop. It is understood that while the only master CPU 116*a* is described above, the checker CPU 120*a* is configured to identical tasks as the master CPU 116*a*.

The RTM 136*a* communicates a module health value indicative of the overall health of the master CPU 116*a*. For example, the RTM 136*a* is configured to perform a logical OR on the value stored in the first memory location and the value stored in the second memory location. For example, when the value stored in the first memory location is 0 and when the value stored in the second memory location is 0 the RTM 136*a* will a communicate a module health value of 0.

When the value stored in the first memory location is 1 and the value stored in the second memory location is a 0, the RTM 136*a* communicates a module health value of 1. It is understood that each of the RTMs 136*a*-136*i* is configured to perform a logical OR on values stored within memory of associated with each of the front blades 124*a*-128*f*.

The RTMs 136*a* and 136*b* communicate a chassis health value to the safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136*a*, RTM 136*b*, RTM 140*a*, and RTM 140*b*. The RTM 136*a* generates a first chassis health value based on the cumulative result of the module health signals generated by the master CPU 116*a* and the front blades 124*a*-128*f* and a value stored in the mask registers.

The RTM 136*a* communicates the chassis health value to the safety relay box module 144. Similarly, the RTM 136*b* generates a second chassis health value based the cumulative result of the module health signals generated by the checker CPU 120*a* and the front blades 124*a*-128*f* and a value stored in the mask registers. The RTM 140*a* generates a third chassis health value based on the cumulative result of the module health signals generated by the master CPU 116*b* and the front blades 124*b*-132*f* and a value stored in the mask registers. Similarly, the RTM 140*b* generates a fourth chassis health value based on the cumulative result of the module health signals generated by the checker CPU 120*b* and the front blades 124*b*-132*f* and a value stored in the mask registers.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136*a* and 136*b*. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter the failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

In some implementations, the safety relay box module 144 is configured to communicate with a plurality of commercial off the shelf (COTS) products. For example, the active FSC 104 and the standby FSC 108 may be COTS products implemented within the system 100. The active FSC 104 and the standby FSC 108 are configured according to a predetermined implementation standard. The implementation standard includes a predefined communication protocol.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100. Further, any component within the system 100 may be implemented utilizing COTS products so long as the any component follows the communication protocol.

In some implementations, the I/O subsystem also receives packets from external sources such as hardware and software components of the rail system. The received packets may include the plurality of incoming data packets as discussed above. The I/O subsystem then communicates the received packets to the voting subsystem.

The voting subsystem is a functional safety subsystem and is configured to detect and respond to failures. When the voting subsystem detects an error in one of the active FSC 104 and the standby FSC 108, the voting subsystem forces the one of the active FSC 104 and the standby FSC 108 to the failsafe state. The voting subsystem performs fault detection of the processing subsystem. For example, the master CPU 116a and the checker CPU 120a generate outgoing packets based on a requested task.

The voting subsystem compares the outgoing packets generated by the mater CPU 116a to the outgoing packets generated by the checker CPU 120a. When the outgoing packets are identical, the voting subsystem communicates a single copy of a packet to the switch module 124a and to the I/O subsystem. When the outgoing packets are not identical, the voting subsystem forces the active FSC 104 to the failsafe state. In this way, the voting subsystem detects faults in one of the active FSC 104 and the standby FSC 108. Upon detecting a fault in the one of the active FSC 104 and the standby FSC 108, the voting subsystem brings the system 100 to a safe state by forcing the faulty FSC to the failsafe state.

The voting subsystem also receives packets from the I/O subsystem. For example, the IOU modules 128 communicate with the voting subsystem via the switch modules 124a. The IOU modules 128 communicate a first packet to switch module 124a. The switch module 124a duplicates the first packet. For example, the switch module 124a generates a second packet. The second packet is a copy of the first packet. The switch module 124a communicates the first packet to the master CPU 116a and the checker CPU 120a. The master CPU 116a and the checker CPU 120a executing voting logic on the first and second packets as described above. In this way, the voting subsystem verifies the validity of the received packets.

In another example, the first packet may not be identical to the second packet due to a hardware malfunction in an external component, such as the safety critical hardware of the rail system. When the voting subsystem determines the first packet is not identical to the second packet, the safety application forces the active FSC 104 to the failsafe state. Additionally or alternatively, the mismatched packets may be silently discarded. For example, neither the master CPU 116a nor the checker 120a generates an outgoing packet based on the first and second packet. In this way, the system 100 may avoid excessive failover/failsafe transitions due to otherwise recoverable errors. In another implementation, input voting may be configured to result in failover/failsafe transition.

Figure 2:
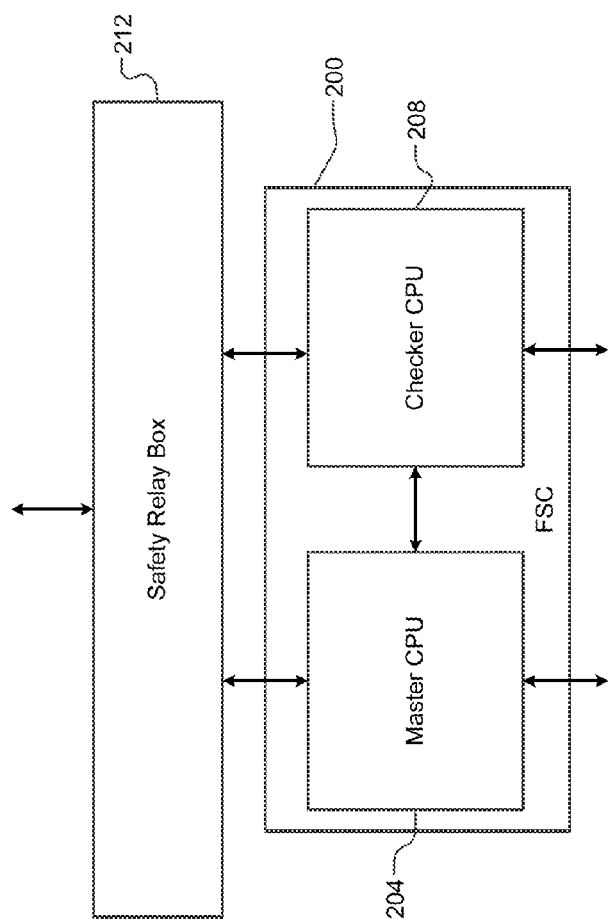
FIG. 2 is a functional block diagram of a fail-safe chassis according to the principles of the present disclosure.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an external safety system. The external safety system may be a system that is required to operate according to a predetermined safety standard, such as a railway system. The railway system includes safety critical hardware and software. The safety critical hardware and software interact with components of the railway system in order to control aspects of the railway system. For example, the safety critical hardware and software controls a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software. For example, the master CPU 204 and the checker CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application.) For example only, the master CPU 204 receives erroneous requests to perform tasks due to external hardware failure, a software error, or an overall system malfunction.

The master CPU 204 and the checker CPU 208 include a mask register. The mask register is a programmable bit within the master CPU 204 and the checker CPU 208. A value stored in the mask register is indicates whether a requested task is a safety-relevant task. For example, the mask register is set to 1 when the system 100 determines a requested task is a safety-relevant task. Further, the health and safety application sets the mask register when the system 100 is initially started.

The master CPU 204 and checker CPU 208 each continuously generate a module health signal based on a determination of whether the requests tasks are identical. When the master CPU 204 and the checker CPU 208 determine the requested tasks are identical, the master CPU 204 and the checker CPU 208 continuously generate the module health signal pulse. When the master CPU 204 and the checker CPU 208 determine the requested tasks are not identical, the master CPU 204 and the checker CPU 208 de-assert the module health signal pulse.

The master CPU 204 and the checker CPU 208 generate a chassis health signal pulse based on a plurality of module health signal pulse generated by each of a plurality of modules associated with the FSC 200. The FSC 200 includes similar features as those described with respect to the active FSC 104. For example, the FSC 200 includes the front blades 124a-128f as described above. Each of the modules within the FSC 200 continuously generates a module health signal (as described above). The master CPU 204 generates a first chassis health signal pulse when the plurality of module health signals indicates the FSC 200 is healthy. In other words, the first chassis health signal pulse is continuously asserted (i.e., set to 1) when the mask register indicates the requested task is safety relevant and the plurality of module health signals indicate the FSC 200 is healthy.

It is understood that when the mask register indicates the requested task is not safety relevant (i.e., the mask register is set to 0) the first module health signal pulse may be de-asserted. However, safety relevant procedures (i.e., forcing the active FSC 204 to a safe state) will not be executed. In this way, failover/failsafe procedures are only implemented when a fault occurs during a safety relevant task. The chassis health signal pulse is indicative of the overall health of the FSC 200.

It is understood that principles described with respect to the master CPU 204 apply to the checker CPU 208. The checker CPU 208 generates a second chassis health signal pulse based on a plurality of module health signal pulse generated by each of a plurality of modules associated with the FSC 200. The checker CPU 208 continuously generates the second chassis health signal pulse when the plurality of module health signals indicates the FSC 200 is healthy. The master CPU 204 communicates a first chassis health signal pulse to a safety relay box 212. Similarly, the checker CPU 208 communicates a second chassis health signal pulse to a safety relay box 212.

The safety relay box module 212 selectively determines whether the FSC 200 will operate as an active FSC based on a plurality of chassis health signals. For example, the safety relay box module 212 begins receiving a chassis health signal pulse from the master CPU 204 when the FSC 200 is initiated. The safety relay box 212 also begins receiving a chassis health signal pulse from the checker CPU 208. The safety relay box module 212 determines whether the FSC 200 will be elected as the active FSC based on the chassis health signals.

In some implementations, the safety relay box module 212 also receives a plurality of chassis health signal pulses from another FSC. The safety relay box module 212 determines whether the FSC 200 or the other FSC will be elected as the active FSC based on the plurality of chassis health signal pulses. For example, the safety relay box module 212 first determines whether one of the FSC 200 or the other FSC is healthy. The safety relay box module 212 determines the FSC 200 is healthy when the chassis health signal pulses received from the FSC 200 indicate the FSC 200 is healthy. For example, the safety relay box 212 determines the FSC 200 is healthy when the safety relay box 212 receives a chassis health signal from the FSC 200.

Similarly, the safety relay box module 212 determines the other FSC is healthy when the plurality of chassis health signal pulses received from the other FSC indicate the other FSC is healthy. When safety relay box module 212 determines that both of the FSC 200 and the other FSC are healthy, the safety relay box module 212 elects an active FSC based on which of the FSC 200 and the other FSC communicated one of the plurality of chassis health signal pulses first. For example, when the FSC 200 communicates a signal to the safety relay box module 212 before the other FSC communicates a signal to the safety relay box module 212, the safety relay box module 212 elects the FSC 200 as the active FSC.

The safety relay box module 212 monitors the health of the active FSC. For example, the safety relay box module 212 receives the first and second chassis health signal pulses from the FSC 200. The safety relay box module 212 determines whether a fault has occurred in the FSC 200 based on the first and second chassis health signal pulses. The safety relay box 212 determines a fault has occurred in the FSC 200 when at least one of the first and second chassis health signal pulses is indicative of a mismatch of the requested tasks. In other words, the safety relay box module 212 determines a fault has occurred when the safety relay box module 212 does not receive one of the first and second chassis health signal pulses.

The safety relay box module 212 generates a failsafe signal when the safety relay box module 212 determines a fault has occurred in the FSC 200. The safety relay box module 212 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box module 212 communicates the active signal when the safety relay box module 212 determines the FSC 200 is to operate as the active FSC. The safety relay box module 212 continuously communicates the active signal to the FSC 200. When the safety relay box module 212 determines the FSC 200 is faulty, the safety relay box module 212 does not communicate an active signal to the FSC 200. The FSC 200 then operates in the standby state.

In some implementations, the plurality of chassis health signal pulses are implemented as dynamic pulse signals to eliminate undetected, latent failure modes. The safety relay box module 212 is configured to determine whether a pulse signal is stuck at 0 or stuck at 1. For example, the safety relay box 212 receives a first pulse signal from the master CPU 204. The safety relay box module 212 is configured to wait a predetermined period of time.

For example, the predetermined period of time may be a period corresponding to a time long enough for a dynamic pulse to reset. The safety relay box module 212 determines the first pulse signal is stuck when the first pulse signal has not been reset after the predetermined period. The safety relay box module 212 determines a fault in the master CPU 204 when then safety relay box module 212 determines the first pulse signal is stuck. The safety relay box module 212 generates a failsafe signal based on determining a fault in the master CPU 204.

Figure 3:
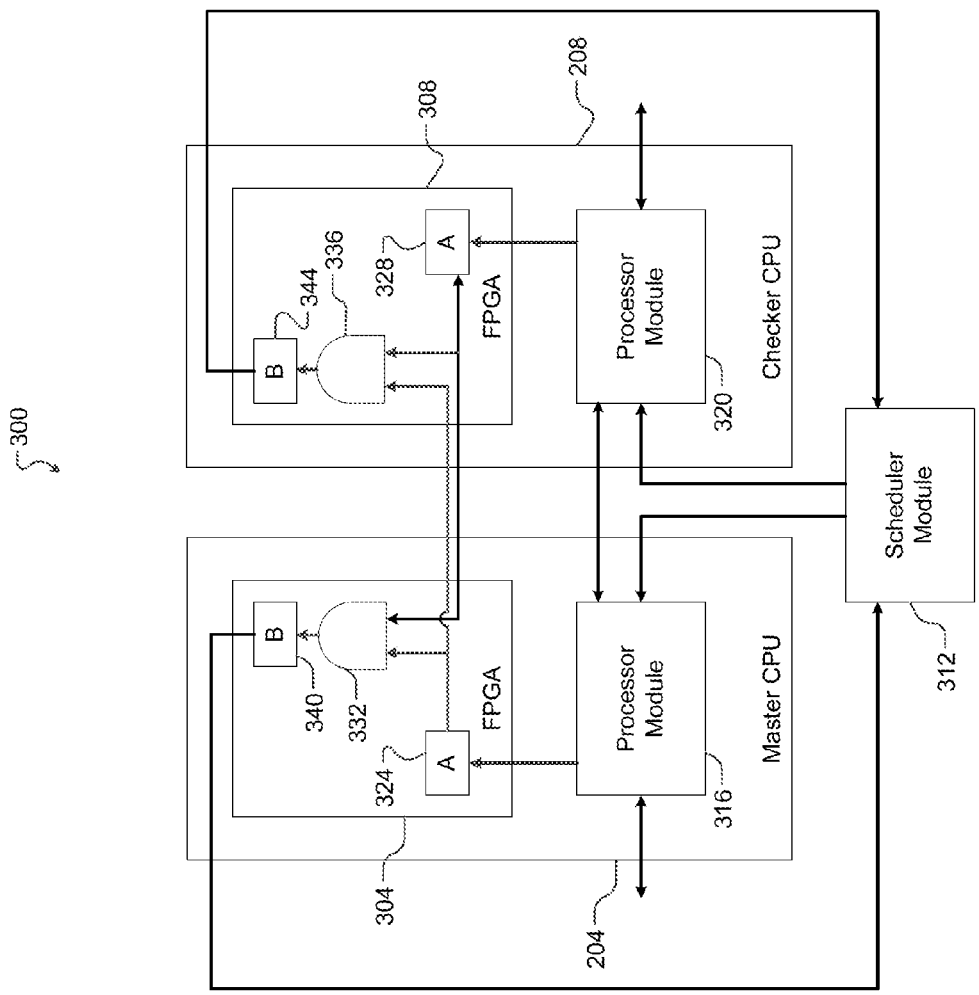
FIG. 3 is a functional block diagram of a synchronization system implementing the synchronization mode according to the principles of the present disclosure.

In some implementations, the master CPU 204 and the checker CPU 208 run in loose lockstep with one and other. In some scenarios, the master CPU 204 and the checker CPU 208 are required to run in a synchronization mode. With particular reference to FIG. 3, a functional block diagram of a synchronization system 300 implementing the synchronization mode is shown. The synchronization mode includes first synchronizing a system clock of each of the master CPU 204 and the checker CPU 208 and second synchronizing an operating system (OS) scheduler in order for the master CPU 204 and the checker CPU 208 to run in the same sequence at a data element level.

Each of the master CPU 204 and the checker CPU 208 include a field-programmable gate array (FPGA) configured to execute synchronization logic. For example, the master CPU 204 includes a master FPGA 304 and the checker CPU 208 includes a checker FPGA 308. Each of the master FPGA 304 and the checker FPGA 308 is configured to implement task synchronization logic. For example, each of the master CPU 204 and the checker CPU 208 are synchronized when a task requests a time instruction and when a task sends and/or receives an Ethernet packet. Further, each of the master FPGA 304 and the checker FPGA 308 may be synchronized to a reference clock.

The reference clock is a 25 megahertz (MHz) clock within the system 100. For example only, the reference clock may be a CPU decrementer. The reference clock is a common reference clock that each module within the system 100 syncs with. Each module within the system 100 includes a phase locked loop that is synchronized with the reference clock. For example, the master CPU 204 a first clock that counts at a first interval. The master CPU 204 includes a first phase locked loop that determines a reference point between the first interval and a reference clock interval. When the master CPU 204 communicates with another module (for example, the checker CPU 208) within the system 100, the master CPU 204 determines a current reference clock time based on the reference point between the first interval and the reference clock interval. In this manner, each module within the system 100 may reference a time on the reference clock that is common to each module in order to communicate within the system 100.

Each of the master CPU 204 and the checker CPU 208 is configured to execute a software application external to the system 100. For example, the master CPU 204 executes tasks requested by the railway application as described above. The master CPU 204 is configured to execute a first copy of the railway application (first copy). The checker CPU 208 is configured to execute second copy of the railway application (second copy). Each of the first copy and the second copy is configured to execute tasks simultaneously. For example, when the system 100 is restarted, each of the master CPU 204 and the checker CPU 208 initiates the first copy and the second copy respectively. The first copy and the second copy are synchronized to the reference clock in order to execute tasks simultaneously.

In some implementations, the system 300 includes a scheduler module 312. The scheduler module 312 is configured to run software stored in an associated memory. The scheduler module 312 executes an OS scheduler. The OS scheduler is a software program that communicates OS level tasks to the master CPU 204 and the checker CPU 208. In some implementations, the scheduler module 312 determines whether the master CPU 204 and the checker CPU 208 are synchronized based on a task synchronization point. The task synchronization point may be referred to as a checkpoint.

The synchronization point may be when a task requests a time instruction, when each task sends and/or receives an Ethernet packet, or when a new task begins. Additionally or alternatively, software external to the system 300 may control the synchronization point. The scheduler module 312 communicates a first synchronization point to the master CPU 204 and the checker CPU 208. As described above, the master CPU 204 and the checker CPU 208 execute identical copies of application software. The master CPU 204 and the checker CPU 208 are configured to be identical, and therefore, execute requested tasks associated with the application simultaneously. However, the synchronization of the master CPU 204 and checker CPU 208 may be affected by inherent inaccuracies in the reference clock and inherent differences in hardware tolerances.

The synchronization point is an operating system event that occurs when the master CPU 204 and the checker CPU 208 should be writing the same address. As a non-limiting example, the master CPU 204 and the checker CPU 208 should both write the same address after 5 cycles of the reference clock. The operating system monitors the synchronization point of a processor module 316 within the master CPU 204 and a processor module 320 with in the checker CPU 208.

For example, the processor module 316 and the processor module 320 each receive a plurality of tasks to execute from the first and second copy of the application software. In order to ensure that the processor module 316 and the processor module 320 are executing identical tasks in synchronization, prior to executing the task, both the processor module 316 and the processor module 320 write a memory address to a memory register. For example, the processor module 316 writes the address of the first synchronization point to a register A 324 when the master CPU 204 reaches the synchronization point. Similarly, the processor module 320 writes the address of the first synchronization point to a register A 328 when the checker CPU 208 reaches the synchronization point.

The FPGA 304 includes a logical AND module 332 and a register B 340. Similarly, the FPGA 308 includes a logical AND module 336 and a register B 344. The logical AND module 332 receives the address stored in register A 324 and register A 328. The logical AND 332 performs a logical AND on the received addresses. For example only, the logical AND 332 determines whether the first bit of the address in register A 324 and the first bit of the address in register A 328 are the same. When the first bit in both addresses are the same, the logical AND module 332 writes a 1 in the first bit of the register B 340. Those skilled in the art can appreciate that while only a one bit example is described, the register A may include a plurality of bits. Further, while only a positive logical AND outcome is described, the logical AND 332 may write a 0 to a bit within the register B 340 when the address bits in the registers A 324 and 328 are not the same.

The logical AND module 336 receives the address stored in register A 324 and register A 328. The logical AND 336 performs a logical AND on the received addresses. For example only, the logical AND 336 determines whether the first bit of the address in register A 324 and the first bit of the address in register A 328 are the same. When the first bit in both addresses are the same, the logical AND module 336 writes a 1 in the first bit of the register B 344. Those skilled in the art can appreciate that while only a one bit example is described, the register A may include a plurality of bits. Further, while only a positive logical AND outcome is described, the logical AND 336 may write a 0 to a bit within the register B 344 when the address bits in the registers A 324 and 328 are not the same.

The scheduler module 312 monitors the register B 340 and the register B 344. For example, the scheduler module 312 receives a first value from the register B 340 and a second value from the register B 344 at a first synchronization point. The first synchronization point may be a predetermined memory address. The scheduler module 312 determines whether the first value is the same as the second value. The scheduler module 312 determines the master CPU 204 and the checker CPU 208 are synchronized when the scheduler module 312 determines the first value is set to 1 and the second value is set to 1. It is understood that the value stored in the register B 340 and register B 344 may be a series of bits set to 1. The scheduler module 312 generates a processor synchronization signal. The scheduler module 312 communicates the processor synchronization signal to the processor module 316 and the processor module 320.

The scheduler module 312 determines the master CPU 204 and the checker CPU 208 are not synchronized when the scheduler module 312 determines the first value is not the same as the second value. For example, at least one of the first value and the second value is not set to 1. The scheduler module 312 increments a synchronization counter. The scheduler module 312 receives a third value from the register B 340 and a fourth value from the register B 344 at a second synchronization point. The second synchronization point may be after a predetermined number of memory addresses after the first synchronization point. The scheduler module 312 determines whether the third value and the fourth value are set to 1.

As described above, the scheduler module 312 determines the master CPU 204 and the checker CPU 208 are synchronized when the scheduler module 312 determines the third value is set to 1 and the fourth value is set to 1. The scheduler module 312 generates the processor synchronization signal. The scheduler module 312 communicates the processor synchronization signal to the processor module 316 and the processor module 320. The scheduler module 312 increments the synchronization counter when the scheduler module 312 determines the third value is not the same as the fourth value.

The scheduler module 312 continues to monitor values from the register B 340 and the register B 344 until the scheduler module 312 determines the master CPU 204 and the checker CPU 208 are synchronized. The scheduler module 312 communicates the processor synchronization signal to the processor module 316 and the processor module 320.

The processor module 316 and the processor module 320 determine whether to execute tasks associated with the first and second copy of the application software based on the processor synchronization signal. For example, the processor modules 316 and 320 execute tasks associated with the first and second copies of the application when the processor modules 316 and 320 receive the processor synchronization signal. In other words, one the scheduler module 312 determines the master CPU 204 and the checker CPU 208 are synchronized, the master CPU 204 and the checker CPU 208 are released and begin executing tasks.

Further, the processor module 316 and the processor module 320 determine whether to send and/or receive an Ethernet packet based on the processor synchronization signal. For example, the processor modules 316 and 320 send and receive data packets associated with the system 300. The data packets may include the plurality of data packets described with respect to FIGS. 1 and 2. By way of non-limiting example only, the processor module 316 may generate a first outgoing data packet. The processor module 316 transmits the first outgoing data packet when the processor module 316 receives the processor synchronization signal. Similarly, the processor module 320 may generate a second outgoing data packet. The processor module 320 transmits the second outgoing data packet when the processor module 320 receives the processor synchronization signal. It is understood that while only transmitting data packets is described, the principles of the present disclosure also apply to each of the processor modules 316 and 320 receive data packets.

In some implementations, the scheduler module 312 determines whether to restart the system 300 based on the synchronization counter. For example, the schedule module 312 compares a value of the synchronization counter to a predetermined threshold. The predetermined threshold may be a value associated with a number of missed synchronization points. For example, the predetermined threshold may be 3. In other words, once the scheduler module 312 determines that the master CPU 204 and the checker CPU 208 were out of synchronization 3 times. When the scheduler module 312 determines the value in the synchronization counter is greater than the predetermined threshold, the scheduler module 312 instructs the system 300 to restart.

In yet other implementations, the granularity of synchronization may be controlled based on a density of the synchronization point. For example, the scheduler module 312 compares the current memory address stored in the register A 324 with the first synchronization point. The scheduler module 312 increments a master sync counter when the current memory address is not the same as the first synchronization point. The scheduler module 312 continues to compare the current memory address stored in the register A 324 with the first synchronization point. The scheduler module 312 continues to increment the master sync counter until the current memory address is the same as the first synchronization point. In other words, the scheduler module 312 counts until the master CPU 204 reaches the first synchronization point.

Similarly, the scheduler module 312 compares the current memory address stored in the register A 328 with the first synchronization point. The scheduler module 312 increments a checker sync counter when the current memory address is not the same as the first synchronization point. The scheduler module 312 continues to compare the current memory address stored in the register A 328 with the first synchronization point. The scheduler module 312 continues to increment the checker sync counter until the current memory address is the same as the first synchronization point. In other words, the scheduler module 312 counts until the checker CPU 204 reaches the first synchronization point.

The scheduler module 312 selectively adjusts a synchronization density based on the value in the master sync counter and the value in the checker sync counter. For example, a synchronization point can be added at a task level or a time slice level based on whether the values stored in the master sync counter and the checker sync counter are greater than a density threshold.

In another implementation, the processor module 316 and the processor module 320 each receive the plurality of tasks to execute from the first and second copy of the application software. In order to ensure that the processor module 316 and the processor module 320 are executing identical tasks in synchronization, prior to executing the task, the processor module 316 communicates with the processor module 320 via an inter-processor communication (IPC) channel. For example only, the IPC channel may be dual-redundant, high speed, point-to-point serial communication link between the master CPU 204 and the checker CPU 208.

Each of the processor modules 316 and 320 generate a plurality of synchronization messages based on operating system events. The operating system events may include a task requesting a time instruction, a request sending and/or receiving a data packet, or any other suitable operating system event. The processor module 316 generates a first synchronization message when the master CPU 204 reaches the synchronization point. The processor module 316 communicates the first synchronization message to the processor module 320. Similarly, the processor module 320 generates a second synchronization message when the checker CPU 208 reaches the synchronization point. The processor module 320 communicates the second synchronization message to the processor module 316.

The processor module 316 determines whether the processor module 320 has communicated a synchronization message. When the processor module 316 determines the processor module 320 has not communicated a synchronization message, the processor module 316 continues to wait to receive a synchronization message from the processor module 320. The processor module 316 increments the synchronization counter. Conversely, when the processor module 316 determines the processor module 320 has communicated a synchronization message, the processor module 316 determines whether the synchronization message indicates the processor module 320 is synchronized with the processor module 316.

For example, the processor module 316 generates the first synchronization message based on a first task requesting a first time instruction. The processor module 320 generates the second synchronization message based on a second task requesting a second time instruction. The processor module 316 receives the second synchronization message from the processor module 320. The processor module 316 determines whether the master CPU 204 and the checker CPU 208 are synchronized based on the first and second synchronization messages.

For example, when the processor module 316 compares the first synchronization message to the second synchronization message. When the processor module 316 determines the first synchronization message is the same as the second synchronization message, the processor module 316 determines the master CPU 204 and the checker CPU 208 are synchronized. When the processor module 316 determines the master CPU 204 and the checker CPU 208 are synchronized, the processor module 316 generates a first processor synchronization signal to the processor module 320.

Similarly, the processor module 320 determines whether the processor module 316 has communicated a synchronization message. When the processor module 320 determines the processor module 316 has not communicated a synchronization message, the processor module 320 continues to wait to receive a synchronization message from the processor module 316. The processor module 320 increments the synchronization counter. Conversely, when the processor module 320 determines the processor module 316 has communicated a synchronization message, the processor module 320 determines whether the synchronization message indicates the processor module 316 is synchronized with the processor module 320.

For example, the processor module 316 generates the first synchronization message based on a first task requesting a first time instruction. The processor module 320 generates the second synchronization message based on a second task requesting a second time instruction. The processor module 320 receives the first synchronization message from the processor module 316. The processor module 320 determines whether the master CPU 204 and the checker CPU 208 are synchronized based on the first and second synchronization messages.

For example, when the processor module 320 compares the first synchronization message to the second synchronization message. When the processor module 320 determines the first synchronization message is the same as the second synchronization message, the processor module 320 determines the master CPU 204 and the checker CPU 208 are synchronized. When the processor module 320 determines the master CPU 204 and the checker CPU 208 are synchronized, the processor module 320 generates a second processor synchronization signal to the processor module 316.

The processor module 316 and the processor module 320 determine whether to execute tasks associated with the first and second copy of the application software based on the first processor synchronization signal and the second processor synchronization signal. For example, the processor modules 316 execute tasks associated with the first and second copies of the application when the processor modules 316 generates the first processor synchronization signal and receives the second processor synchronization signal. Similarly, the processor modules 320 execute tasks associated with the first and second copies of the application when the processor modules 320 generates the second processor synchronization signal and receives the first processor synchronization signal.

Further, the processor module 316 and the processor module 320 determine whether to send and/or receive an Ethernet packet based on the first and second processor synchronization signals. For example, the processor modules 316 and 320 send and receive data packets associated with the system 300. The data packets may include the plurality of data packets described with respect to FIGS. 1 and 2. By way of non-limiting example only, the processor module 316 may generate a first outgoing data packet. The processor module 316 transmits the first outgoing data packet when the processor module 316 generates the first processor synchronization signal and receives the second processor synchronization signal.

Similarly, the processor module 320 may generate a second outgoing data packet. The processor module 320 transmits the second outgoing data packet when the processor module 320 generates the second synchronization signal and receives the first processor synchronization signal. It is understood that while only transmitting data packets is described, the principles of the present disclosure also apply to each of the processor modules 316 and 320 receive data packets.

In yet other implementations, the granularity of synchronization may be controlled based on a density of the synchronization point. For example, if the operating system is sending multiple data packets, it can use a single checkpoint to communicate the number and/or sequence of packets to be sent, thus reducing the number of checkpoints required to maintain synchronization.

The scheduler module 312 determines whether to restart the system 300 based on the synchronization counter. For example, the schedule module 312 compares a value of the synchronization counter to a predetermined threshold. The predetermined threshold may be a value associated with a number of missed synchronization points. For example, the predetermined threshold may be 3. In other words, once the scheduler module 312 determines that the master CPU 204 and the checker CPU 208 were out of synchronization 3 times. When the scheduler module 312 determines the value in the synchronization counter is greater than the predetermined threshold, the scheduler module 312 instructs the system 300 to restart.

Figure 4:
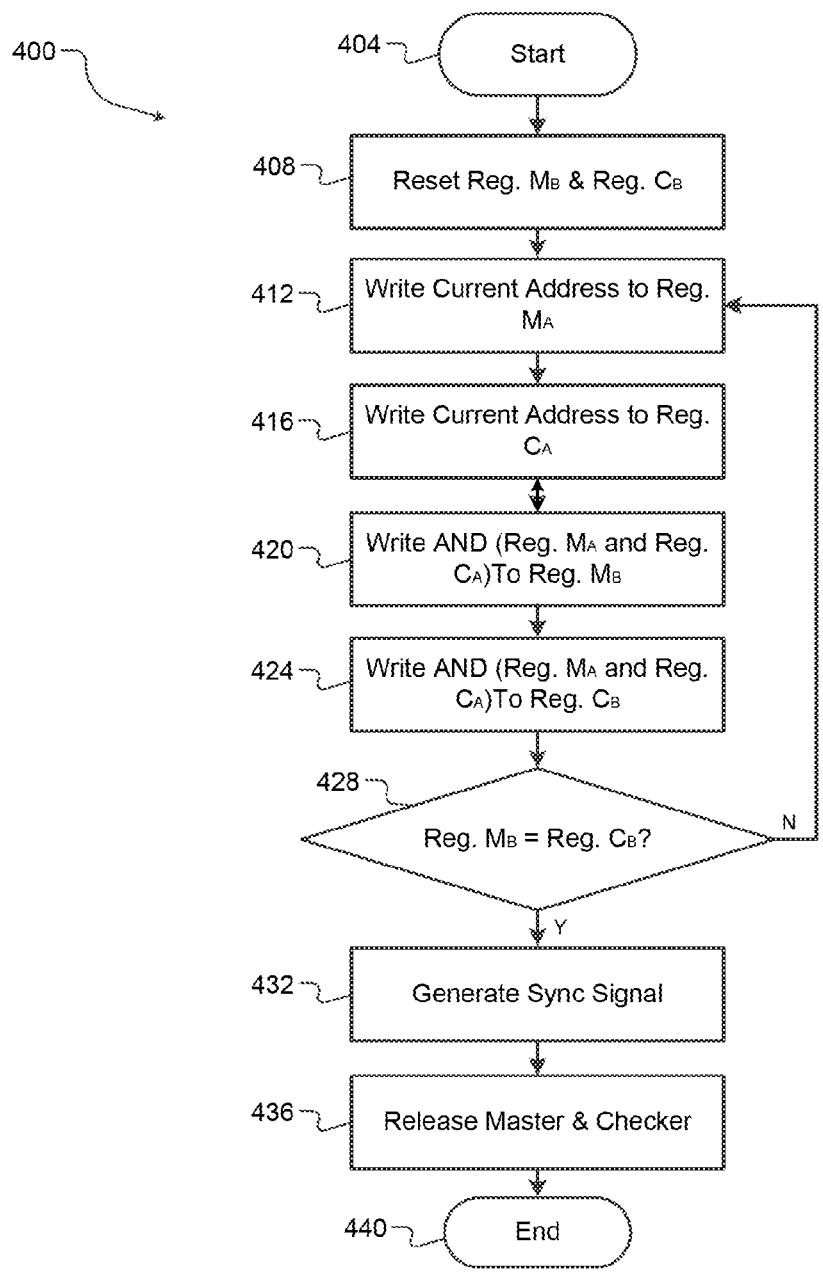
FIG. 4 is a flow diagram illustrating a processor synchronization method according to the principles of the present disclosure.

With reference to FIG. 4, a flow diagram illustrating a processor synchronization method 400 according to the principles of the present disclosure starts at 404. At 408, the method 400 resets the master register B and the checker register B. At 412, the method 400 writes the current master CPU address to the master register A. At 416, the method 400 writes the current checker CPU address to the checker register A. At 420, the method 400 writes the result of a logical AND of the master register A and the checker register A to the master register B. At 424, the method 400 writes the result of a logical AND of the master register A and the checker register A to the checker register B. At 428, the method 400 determines whether the value in the master register B is the same as the value in the checker register B. If true, the method continues at 432. If false, the method continues at 412. At 432, the method 400 generates a processor synchronization signal. At 436, the method 400 releases the master CPU and the checker CPU. The method ends at 440.

Figure 5:
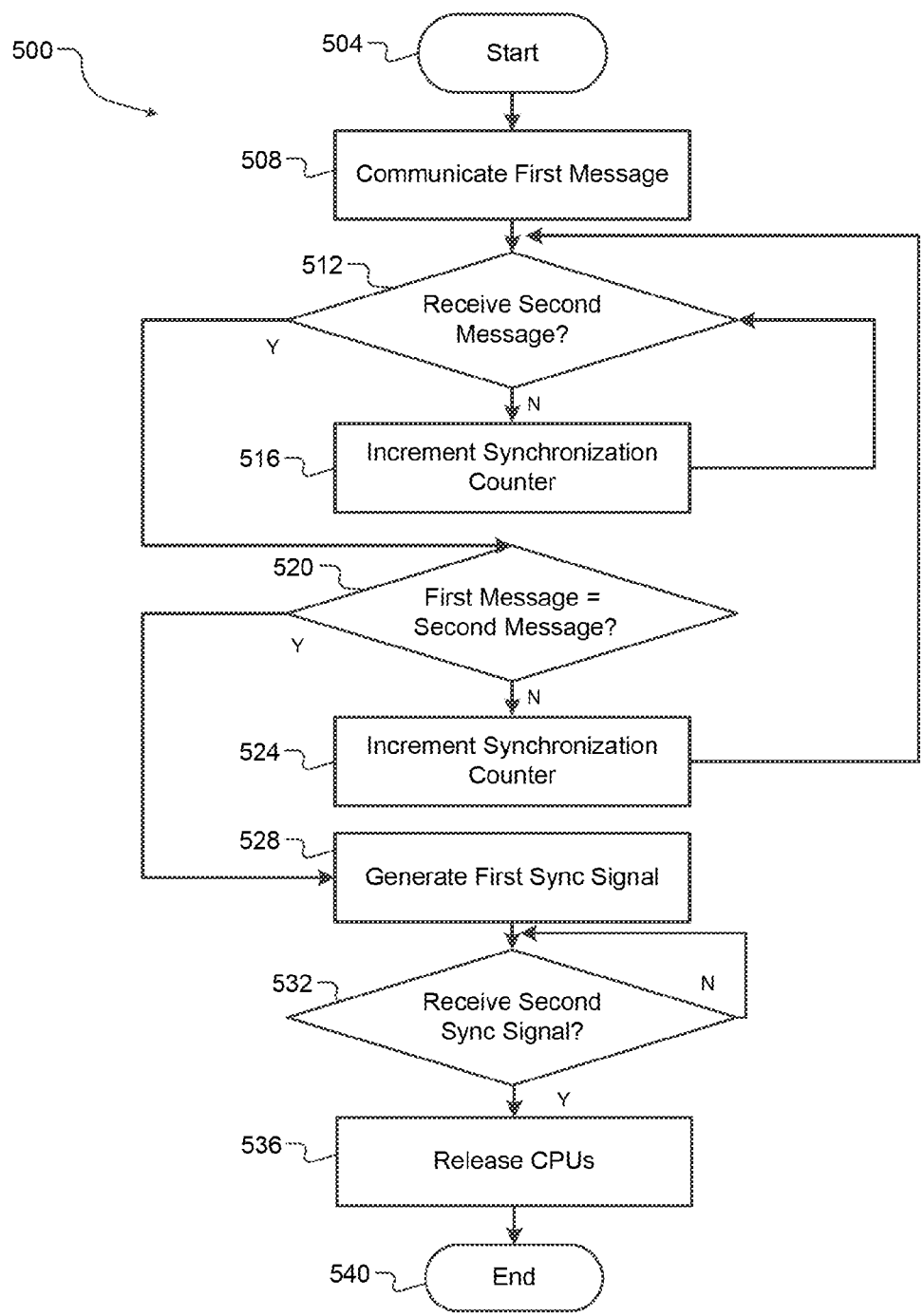
FIG. 5 is a flow diagram illustrating an alternative processor synchronization method according to the principles of the present disclosure.

With reference to FIG. 5, a flow diagram illustrating an alternative processor synchronization method 500 according to the principles of the present disclosure starts at 504. At 508, the method 500 generates a first synchronization message. At 512, the method 500 determines whether a second synchronization message was received. If true, the method 500 continues at 520. If false, the method 500 continues at 516. At 516, the method 500 increments a synchronization counter. The method 500 continues at 512. At 520, the method 500 determines whether the first synchronization message is the same as the second synchronization message.

If true, the method 500 continues at 528. If false, the method 500 continues at 524. At 524, the method 500 increments the synchronization counter. The method 500 continues at 512. At 528, the method 500 generates a first synchronization signal. At 532, the method 500 determines whether a second synchronization signal was received. If true, the method 500 continues at 536. If false, the method 500 continues at 532. At 536, the method 500 releases the master CPU 204 and the checker CPU 208. The method 500 ends at 540.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for synchronizing central processing units (CPU) comprising:
    a scheduler module that communicates a synchronization point;
    a first CPU that writes a first memory address to a first register in response to the first CPU reaching the synchronization point;
    a second CPU that writes a second memory address to a second register in response to the second CPU reaching the synchronization point;
    a first logical AND module that writes a first value to a third register based on the first and second memory addresses;
    a second logical AND module that writes a second value to a fourth register based on the first and second memory addresses; and
    a scheduler module that selectively generates a processor sync signal based on the first and second value.

2. The system of claim 1 wherein the scheduler module generates the processor sync signal in response to the first and second values being set to 1.

3. The system of claim 1 wherein the scheduler module does not generate the processor sync signal in response to the first value not being equal to the second value.

4. The system of claim 1 wherein the first logical AND module performs a logical AND function on the first and second memory addresses.

5. The system of claim 4 wherein the first logical AND module writes a 1 to the third register in response to the first and second memory addresses being the same.

6. The system of claim 1 wherein the second logical AND module performs a logical AND function on the first and second memory addresses.

7. The system of claim 6 wherein the second logical AND module writes a 1 to the fourth register in response to the first and second memory addresses being the same.

8. The system of claim 1 wherein the first CPU includes a first processor module and wherein the second CPU includes a second processor module.

9. The system of claim 8 wherein the scheduler module communicates the processor sync signal to the first processor module and the second processor module.

10. The system of claim 9 wherein the first processor module selectively executes a first plurality of tasks in response to receiving the processor sync signal and wherein the second processor module selectively executes a second plurality of tasks in response to receiving the processor sync signal.

* * * * *